United States Patent [19]

Belokin

[11] 4,386,478
[45] Jun. 7, 1983

[54] CONE-SHAPED RETRIEVABLE AND SELF-CONTAINED POWER PROJECTILE FOR AN INSECT KILLING GUN

[75] Inventor: Martin P. Belokin, Hayward, Wis.

[73] Assignee: Martin-Paul, Inc., Hayward, Wis.

[21] Appl. No.: 269,321

[22] Filed: Jun. 1, 1981

[51] Int. Cl.³ .............................................. A01M 3/02
[52] U.S. Cl. ........................................ 43/135; 124/16
[58] Field of Search ................... 43/134, 135; 124/16, 124/27, 25, 41 R, 35, 26, 31; 46/74 R, 74 A, 74 B, 81, 84; 273/414, 428, 416

[56] References Cited

U.S. PATENT DOCUMENTS

| | | | |
|---|---|---|---|
| 1,261,957 | 4/1918 | Pewther | 273/420 |
| 1,291,113 | 1/1919 | Pewther | 124/27 |
| 1,310,124 | 7/1919 | Ludke | 43/135 |
| 1,468,373 | 9/1923 | Blake | 43/135 |
| 4,195,615 | 4/1980 | Belokin | 124/16 |

*Primary Examiner*—Nicholas P. Godici
*Assistant Examiner*—M. Jordan
*Attorney, Agent, or Firm*—James E. Nilles

[57] ABSTRACT

A retrievable and self-contained power projectile including a flexible and shallow, cone-shaped disc at its front end to kill flies, insects or the like, and a tubular member which carries a spring that powers the projectile. The disc is formed by a series of concentric spaced apart rings held in the cone shape by a series of tapered ribs at the rear side of the disc, all being formed integrally of a relatively soft plastic such as polypropylene.

9 Claims, 6 Drawing Figures

CONE-SHAPED RETRIEVABLE AND SELF-CONTAINED POWER PROJECTILE FOR AN INSECT KILLING GUN

BACKGROUND OF THE INVENTION

One example of prior art projectiles of the type to which this invention pertains is shown in my U.S. Pat. No. 4,195,615, issued on Apr. 1, 1980, which discloses a plastic, substantially flat disc of generally screen-like structure. While the flat projectile of that patent did work satisfactorily, in some instances, due to the molding operation, or when it came off the press and during cooling, or due to mishandling in packaging or shipment of the projectile, the projectile disc was not always kept flat and had a tendency to warp; or if the customer left the projectile in the hot sun, it would warp. The warped projectile disc did not always perform effectively in killing the insect. For instance, the center of the body of the disc will strike the target surface first and only portions of the disc may come in contact with the surface while the warped portions will not. This may permit the insect to escape or only be stunned.

Other examples of prior art projectiles are shown in the U.S. Pat. to Blake, No. 1,468,373 of Sept. 18, 1923 which suggests making the swatter concave to imprison or entrap the insect (page 2, column 1, lines 28, 29). The projectile in that patent used a woven wire screen having its marginal edge bound by a member 16, and the projectile did not leave the gun but was restrained by a stop pin 5.

Other prior art devices are shown in U.S. Pat. Nos. 1,291,113 of Jan. 14, 1919; 1,310,124 of July 15, 1919 and 1,261,957 of Apr. 9, 1918.

SUMMARY OF THE INVENTION

The present invention provides a spring powered retrievable projectile for an insect killing gun, which projectile is formed of flexible plastic and is shaped as a shallow cone-shaped disc. When the disc strikes the target surface, the outer diametrical portion is the first to come into contact with the target surface, encompassing the target, and then the thrust of the central portion of the projectile flattens out the entire disc upon impact which deforms in an orderly manner and firmly against the target surface so as to ensure killing of the insect. The concave shaped disc is aided in retaining its cone shape by means of a series of strengthening ribs that are tapered and extend in a radial outer direction on the rear side of the disc. A still more limited aspect of the invention is to fashion the disc from a series of interconnected concentric rings which permit some of the outer rings to be removed or cut away and thereby vary the diameter of the disc in accordance with the skill of the operator.

A still more limited aspect of the invention relates to a handle in the form of a tubular member for such a disc, and which member houses the power spring and is externally corrugated or ribbed to facilitate its being grasped for insertion on the gun and against the resiliency of its spring. The spring is enlarged at its front end to permit the enlarged end to be removably held captive between the front end of the handle member and the disc, the member being threadably engaged in the disc.

More limited aspects of the invention relate to arrangements and dimensions of various components of the projectile which render it particularly effective.

These and other objects and advantages of the present invention will appear hereinafter as this disclosure progresses, reference being had to the accompanying drawings.

DESCRIPTION OF A PREFERRED EMBODIMENT

Figure 1:
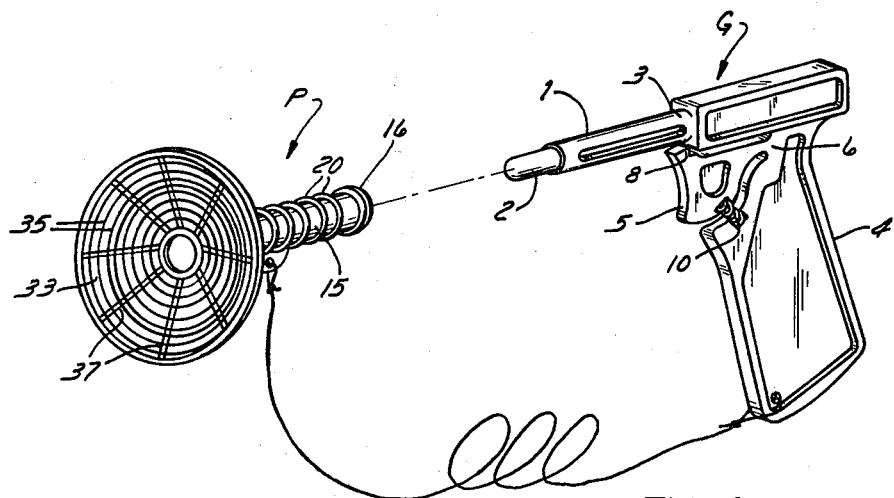
FIG. 1 is a perspective view of the assembly showing the improved projectile removed therefrom.

The gun type fly or insect swatter provided by the present invention includes a gun G having an elongated barrel 1, the barrel in turn having a front end 2 and a rear end 3. The gun also includes a pistol grip handle 4 having a movable trigger 5 attached integrally therewith by means of the integral hinge 6. The barrel, handle, and trigger are all formed integrally as a single unit from a hard plastic. The trigger has a catch 8 located adjacent the rear end of the barrel and for releasably holding a projectile to be described. Resilient means in the form of a spring 10 is located between the handle and the trigger for urging the latter to a projectile holding position.

Figure 2:
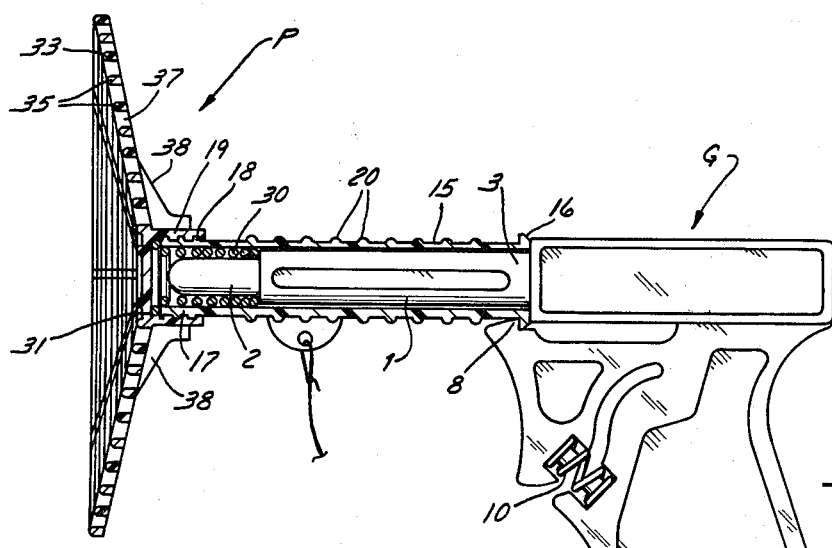
FIG. 2 is a side elevational view of the assembly and showing the projectile in cross-section for the sake of clarity.
Figure 6:
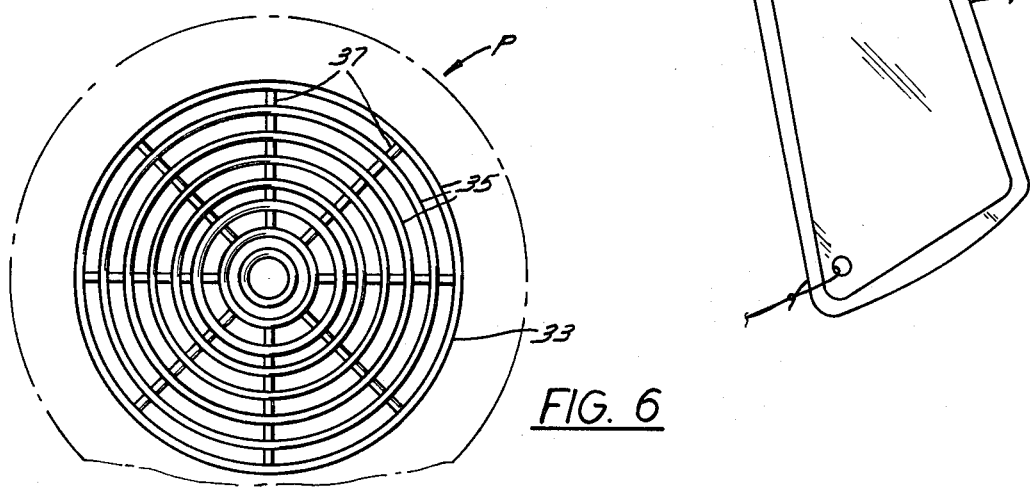
FIG. 6 is a front elevational view of the projectile but showing some of the outer rings being cut away so as to make a projectile of smaller diameter.

The present invention provides a retrievable projectile P having an elongated tubular member 15 including a rear end having an outwardly extending flange 16 which is engaged by trigger 5. The front end 17 of the member 15 has threads 18 formed externally therearound which permit it to be threadably and removably engaged in the internally threaded collar 19 of the projectile P. The tubular member 15 has a series of corrugations or ribs 20 spaced around its length so that the operator can firmly grasp it when the tubular member is to be telescoped over the barrel of the gun. A compressible spring 30 is located within the tubular member and it will be noted (FIGS. 2 and 3) that the front end of the spring 31 is of larger diameter than the internal diameter of the tubular member so that the front end of the spring cannot be withdrawn into the tubular member. Instead the front end of the spring 31 is held captive between the front end of the tubular member and the body of the projectile. This permits easy assembly and ensures that the spring is held tightly in the assembled projectile.

When the projectile is telescoped relative to the barrel of the gun, the spring is compressed so as to form a source of energy or power by means by which the projectile is propelled when the trigger is released. Thus, the spring is carried with the projectile, rather than being left on the gun and consequently, the operator is unable to fire any other objects from the gun. In addition, the spring adds weight to the projectile so as to enhance its killing power.

Figure 3:
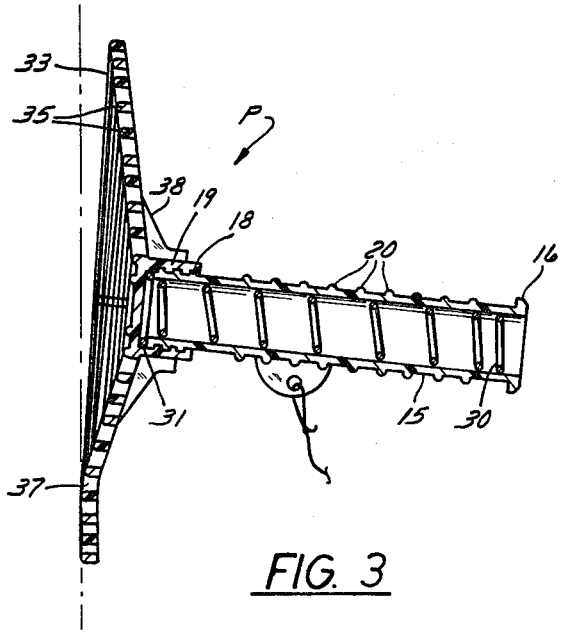
FIG. 3 is a longitudinal cross sectional view through the projectile and showing it as it commences to be compressed against the target surface.
Figure 4:
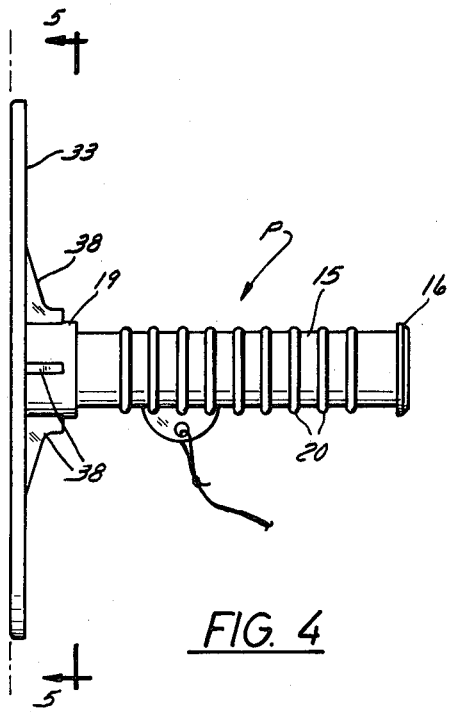
FIG. 4 is a side elevation view of the projectile shown in FIG. 3, but showing it when it has completely deformed against the target surface.
Figure 5:
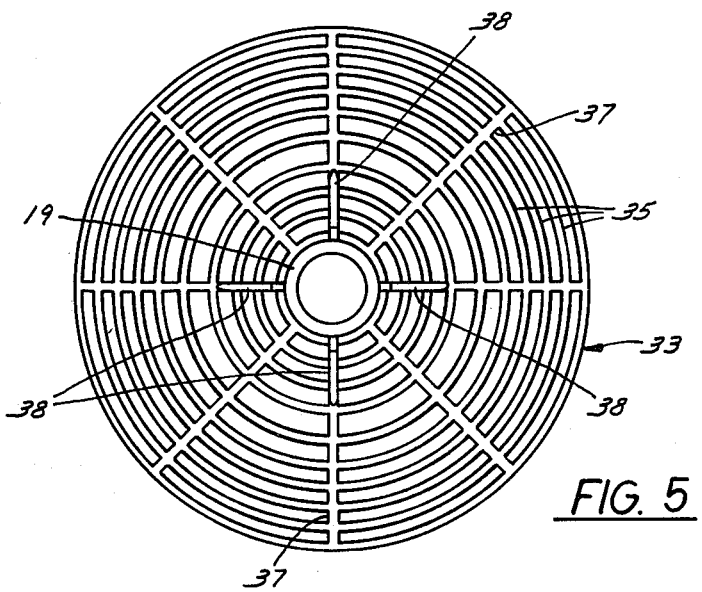
FIG. 5 is a rear end view taken generally along the line 5—5 in FIG. 4.

The projectile is comprised of a relatively soft, flexible plastic material, preferably of polyprophylene, and is shaped as a shallow cone-shaped disc 33. The disc 33 is formed from a series of concentric rings 35 which are integrally molded together by the radially extending radial spakes 37. A series of ribs 38 are integrally formed on the back side of the disc and are formed integrally with the disc and with its collar 19. The ribs taper radially outwardly and terminate completely intermediate the width of the disc. These ribs help hold the discs in its cone shape until the disc strikes the target surface as shown in FIG. 3. The disc is molded in the cone shape originally but the ribs insure maintenance of the cone shape when they are packaged, when they are in flight, and until they engage the target surface.

The shallow cone shape of the disc insures an orderly compression or flattening of the cone upon striking the target surface and ensures complete contact of the disc on the surface and consequently ensures killing of the insect.

Certain dimensions and the shape and size of the cone-shaped disc have been found to be preferable in many instances in order to provide an effective projectile. For example, as originally provided, the disc has a diameter of about three and three-eighths of an inch. The inner depth of the cone is about three-eights of an inch.

The concentric rings are made about 0.060" in thickness and have a space of about 0.060" between them. This gives about a 50% unobstructed area to the disc which results in good air flow through the disc when it is in flight and provides good flight characteristics. These dimensions also provide good strength and permit good plastic flow through the mold cavities with good molding characteristics, all of which ultimately results in the desired degree of disc flexibility.

The ribs 38 are of about the same thickness as the spokes 37. This thickness, together with their outwardly progressive taper towards the disc periphery, also gives the disc good flexing when the projectile strikes the target surface, and also helps insure that the disc returns to its concave shape.

Recapitulation

The flexible plastic projectile of the present invention has a cone-shape or concave disc which is rather shallow and which is made up of a series of concentric rings which are spaced apart from one another. A series of tapered ribs are located on the back side of the disc and aid in maintaining the conical shape of the disc prior to contact with the target surface. This construction ensures that the projectile maintains this shallow cone shape until it strikes the target surface. At that time the outer peripheral portion of the projectile strikes the surface first and the momentum or thrust of the remainder of the projectile causes the cone to completely collapse against the surface and ensures complete contact therewith. This ensures killing of the insect.

The spring is easily inserted in the tubular member up to the limit of the enlarged end of the spring. The tubular member is then threadably engaged in the disc, trapping the enlarged end of the spring between the end of the tube and the disc.

I claim:

1. A retrievable and self-contained power projectile for a gun and comprising an elongated plastic tubular member having a front end, a flexible and shallow cone-shaped disc formed of deformable plastic and extending laterally beyond and around said tubular member and fastened to said front end of said tubular member, said disc being deformable against a surface which it hits so as to provide good contact of said disc against said surface, said disc comprising a series of concentric radially spaced apart rings, generally radially extending spokes integrally formed therewith between said rings, said rings being progressively larger in diameter as they are located outwardly from the center of said disc, whereby any number of rings can be removed from said disc to vary the diametric size thereof, a releasable connection between said disc and said front end of said tubular member, and an elongated spring located in said tubular member, said spring having a front end secured at said front end of said tubular member and compressible therein to provide a self-contained power means in and for said projectile.

2. The projectile set forth in claim 1 including a central collar extending rearwardly from the rear side of said disc, a series of circumferentially spaced apart, radially extending ribs which are integrally formed with and between said disc and said collar at a rear side thereof, said ribs acting on said disc to hold the latter in said shallow cone-shape prior to contact with the target surface.

3. The projectile set forth in claim 1 further characterized in that said spring front end is of a larger diameter than the internal diameter of said tubular member whereby said front end is held between said disc and said front end of said tubular member.

4. The power projectile set forth in claim 1 further characterized in that said releasable connection includes an integrally formed, internally threaded collar at the rear side of said disc, and said front end of said tubular member is threaded and threadably engaged in said collar.

5. A self-contained power projectile comprising an elongated plastic tubular member having a front end, a flexible and shallow cone-shaped disc formed of deformable plastic and extending laterally beyond and around said tubular member and fastened to said front end of said tubular member, said disc being deformable against a surface so as to provide good contact of said disc against said surface, said disc comprising a series of concentric radially spaced apart rings, generally radially extending spokes integrally formed therewith between said rings, said rings being progressively larger in diameter as they are located outwardly from the center of said disc, whereby any number of rings can be removed from said disc to vary the diametric size thereof, and an elongated spring located and secured in said tubular member and compressible therein to provide a self-contained power means for said projectile.

6. The projectile set forth in claim 5 including a central collar extending rearwardly from the rear side of said disc, a series of circumferentially spaced apart, radially extending ribs which are integrally formed with and between said disc and said collar at a rear side thereof, said ribs acting on said disc to hold the latter in said shallow cone-shape prior to contact with the target surface.

7. A self-contained power projectile comprising an elongated plastic tubular member having a front end, a flexible and shallow cone-shaped disc formed of deformable plastic and extending laterally beyond and around said tubular member and fastened to said front end of said tubular member, said disc being deformable against a surface so as to provide good contact of said disc against said surface, said disc comprising a series of concentric radially spaced apart rings, generally radially extending spokes integrally formed therewith between said rings, a central collar extending rearwardly from the rear side of said disc, a series of circumferentially spaced apart and radially extending ribs which are integrally formed with and between said disc and said collar at a rear side thereof, said ribs acting on said disc to hold the latter in said shallow cone-shape prior to contact with the target surface, and an elongated spring located and secured in said tubular member and compressible therein to provide a self-contained power means for said projectile.

8. The projectile set forth in claim 7 further characterized in that said concentric ribs are about 0.060" in thickness and are spaced apart from one another 0.060".

9. The projectile set forth in claim 7 further characterized in that said ribs convergingly taper in their axial height in a radially outward direction, and said ribs are approximately 0.060" in thickness.

* * * * *